April 18, 1939. W. WEIRICH 2,154,595
MEANS FOR WINDING ELECTRIC MOTOR COILS
Filed May 15, 1936 3 Sheets-Sheet 1
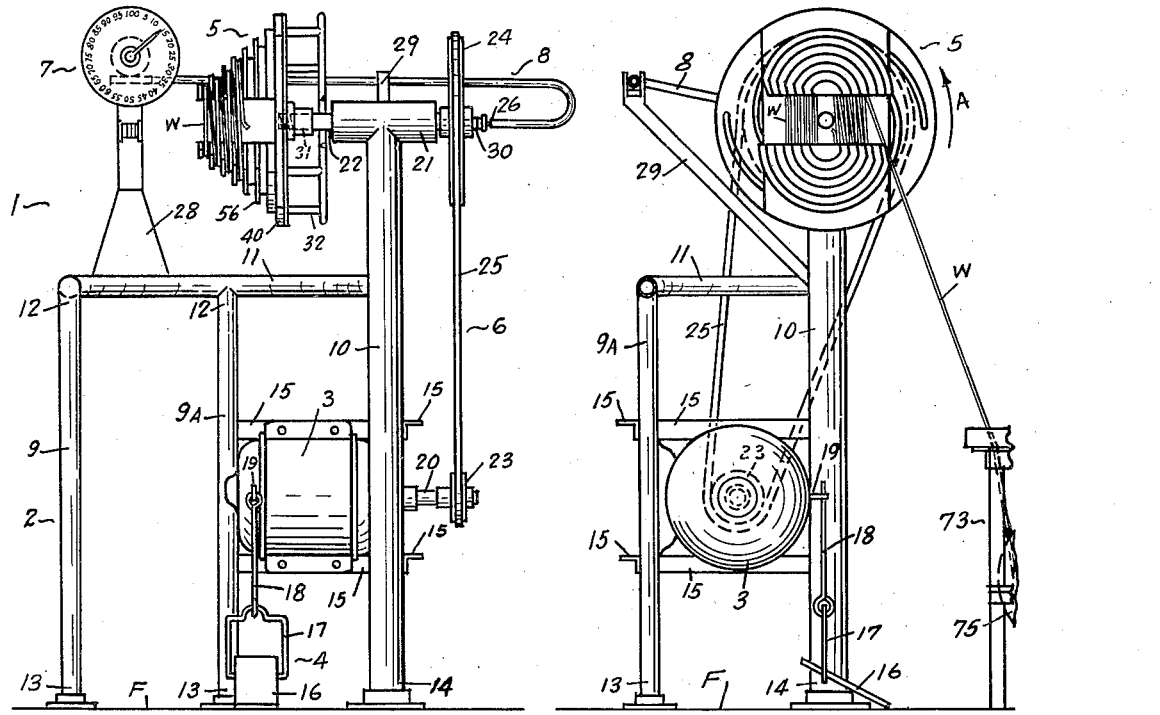
FIG.-1
FIG.-3
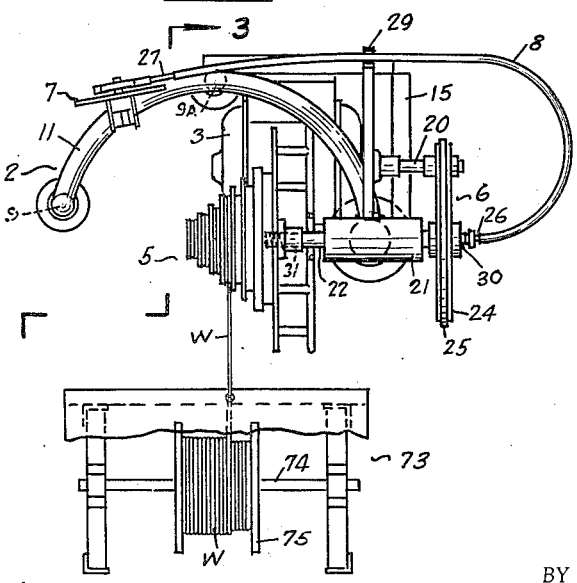
FIG.-2
INVENTOR.
WILLIAM WEIRICH
BY
Caesar and Rivise
ATTORNEYS April 18, 1939.  W. WEIRICH  2,154,595
MEANS FOR WINDING ELECTRIC MOTOR COILS
Filed May 15, 1936   3 Sheets-Sheet 2

INVENTOR.
WILLIAM WEIRICH
BY
Caesar and Rivise
ATTORNEYS

April 18, 1939.  W. WEIRICH  2,154,595
MEANS FOR WINDING ELECTRIC MOTOR COILS
Filed May 15, 1936  3 Sheets-Sheet 3

INVENTOR.
WILLIAM WEIRICH
BY
Caesar and Rivise
ATTORNEYS

Patented Apr. 18, 1939

2,154,595

UNITED STATES PATENT OFFICE 2,154,595

MEANS FOR WINDING ELECTRIC MOTOR COILS

William Weirich, Secane, Pa.

Application May 15, 1936, Serial No. 79,966

16 Claims. (Cl. 140—92.2)

This invention relates to means for winding electric motor coils and has for its object the production of a new and useful device for this purpose. Although my novel device can be used for winding coils for new as well as old motors it is of especial value in repair shops where the coils of motors of various types are being replaced.

As is well known in the electric motor art stator coils for different motors vary in length and width. Further, electric motors may be classified into groups such that the distance between the coil receiving spaces of the stator of any group is constant but wherein the length of the stator core for the different motors in the group varies. When classified as to the distance between the coil receiving spaces of the stator, motors in general use at the present time fall into the following eight groups:

(a) 6 mm. (b) 7 mm. (c) 8 mm. (d) 9 mm. (e) 10 mm. (f) 11 mm. (g) 12.5 mm. (h) 14 mm.

Because of the variations in coil dimensions it was necessary to build a special winding head for each motor for which stator coils were to be wound. In repair shops these winding heads were built up for each job by attaching to a base plate a series of forms each equal in contour and perimeter to the coils which were to be wound and positioning a separating plate between contiguous forms. Because of the diversity in the coil sizes of the motors being handled by any repair shop it was continually necessary to tear down the form used for a preceding job and build up a form for each succeeding job. This was necessary not only in winding coils for stators varying both in length of stator core and distance between core spaces but also for motors which had the same distance between stator spaces and varied only in length of stator core. Both the building up and the tearing down of each form consumed a considerable amount of time. Further to remove the coils it was necessary to first take the built-up form apart.

It is one of the objects of my invention to produce a winding head which will be free of the objections hereinabove set forth.

It is another of the objects of my invention to produce a winding head which wil be capable of winding motor stator coils for motors varying in both length of stator core and distance between stator spaces.

It is still another of the objects of my invention to produce a winding head which will be capable of winding motor stator coils for a group of motors all of which have the same distance between stator receiving spaces but which differ among themselves as to the length of the stator core.

It is a still further object of my invention to produce a winding head which can be built up and and disassembled in the minimum amount of time for use in making motor coils for motors varying in stator core length and in the distance between core spaces, or slots.

It is a still further object of my invention to form a winding head base which will combine with winding forms of differing diameters to form a winding head unit which for any given winding form will give coils of constant diameter but of varying length.

The above as well as other objects are attained by me in the device which for the purpose of illustrating my invention, I have shown on the drawings which form a part hereof and which I will now describe.

In the drawings

Figure 1 is a front view of my novel device with the wire spool carrying bench removed for the purpose of clearness.

Figure 2 is a top view of my novel device including the wire spool carrying bench. A portion of the bench seat has been broken away for the purpose of more clearly showing the wire spool and its supporting shaft. The motor stopping and starting treadle and associated parts have been omitted for the purpose of clearness.

Figure 3 is a section taken along the line 3—3 of Fig. 2. The major portion of the bench and wire spool has been broken away for the purpose of permitting the showing of the winding head and associated parts on as large a scale as possible.

Figure 4:
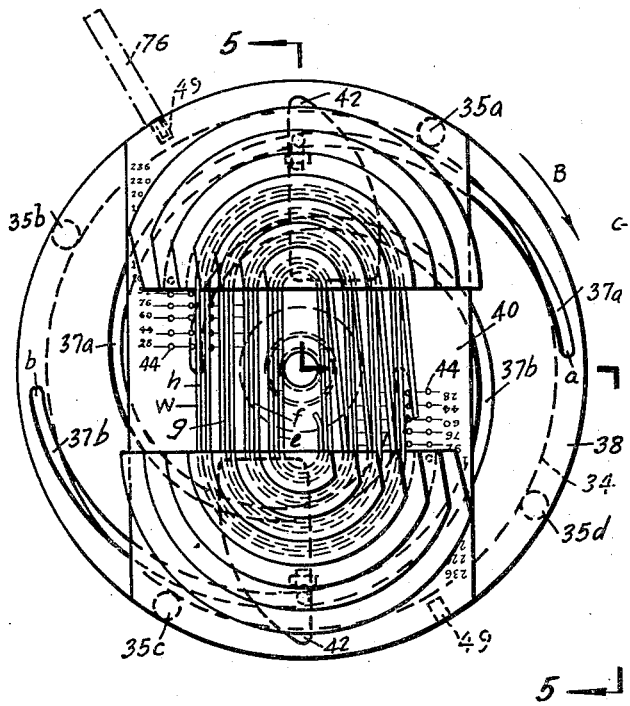
Figure 4 is a front view of my novel winding head dissociated from the remainder of the mechanism and shown as it appears when a motor winding has been completed upon it.

Referring more particularly to the drawings wherein similar reference numerals and reference letters denote similar parts reference numeral 1 denotes my novel winding machine as a unit which consists of a base 2, a variable speed motor 3, controlling means 4 for starting and stopping said motor, my novel winding head 5, power transmitting means 6 for transmitting power from the motor 3 to the winding head 5, the revolution counter 7, and a flexible shaft 8 for connecting the winding head shaft with the revolution counter 7.

The base 2 consists of the columns 9, 9A and 10 and the curved top rail 11 which is attached to the top 12 of the columns 9 and 9A and to the side of the column 10. The lower end 13 of each of the columns 9 and 9A and the lower end 14 of the column 10 are anchored to the floor F.

Attached to the columns 9A and 10 are the angle irons 15 which carry the variable speed motor 3. The motor 3 is a variable speed motor of the type now on the market and well known in the art. It is started and stopped by the controlling means 4 which consists of the treadle 16, the link 17, the rod 18 and the switch connected finger 19.

The column 10 terminates at its upper end in a tube like member 21 which supports and serves as a bearing member for the shaft 22.

Mounted near the outer end 30 of the shaft 22 is a pulley 24. The pulley 24 is connected to the pulley 23 which is mounted on the motor shaft 20 by means of the belt 25. (The shaft 20, the pulley 23, the belt 25, the pulley 24 and the shaft 22 together constitute the power transmitting means 6 for transmitting power from the motor 3 to the winding head 5.)

Connected to the outer end 30 of the shaft 22 is one end 26 of the flexible shaft 8 the other end 27 of which is connected to the revolution counter 7 which is supported by a suitable arm 28 carried by the rail 11. A suitable arm 29 is carried by the column 10 and serves to support the flexible shaft 8 at a point along its course.

The other end 31 of the shaft 22 is threaded for threadably attaching the same to the internally threaded portion 51 of the bore 50 formed in the body member 41 of the positioning plate 40 and in the lug 43 extending rearwardly therefrom.

Figure 5:
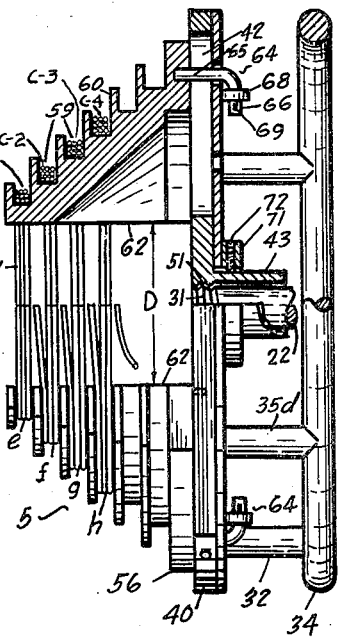
Figure 5 is a section taken along the line 5—5 of Figure 4.
Figure 6:
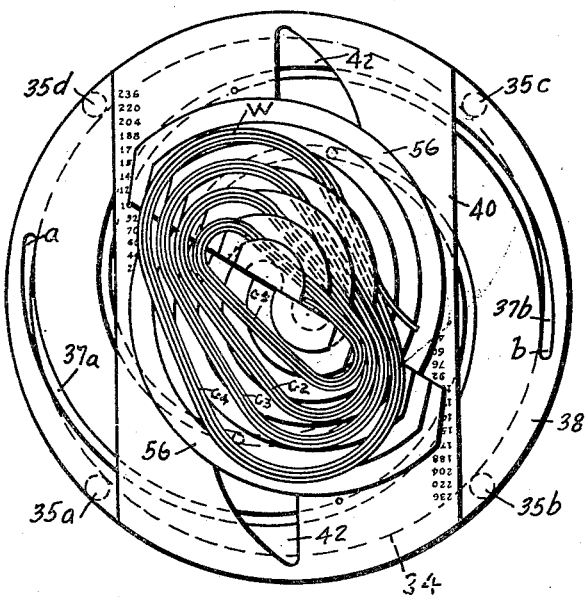
Figure 6 is a front view of my novel winding head showing the winding hemispheres in the collapsed position and carrying the completed coils. This shows the respective positions of the winding head elements and coils just before the coils are removed from the winding head.
Figure 8:
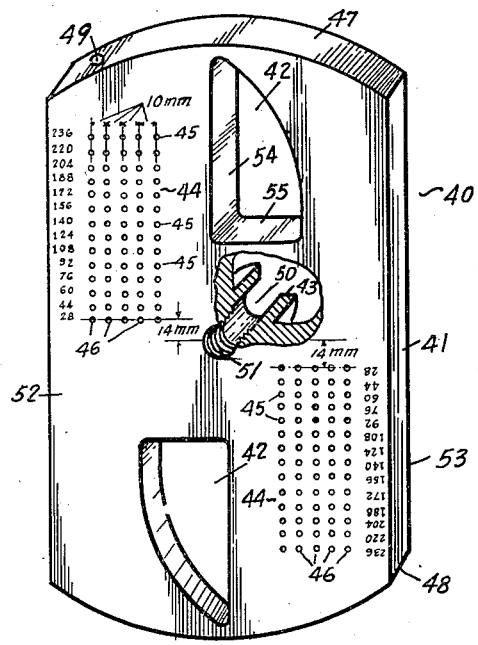
Figure 8 is a perspective view of the positioning plate which constitutes another of the elements of my novel winding head. A portion of the plate has been broken away to show an otherwise hidden part.
Figure 9:
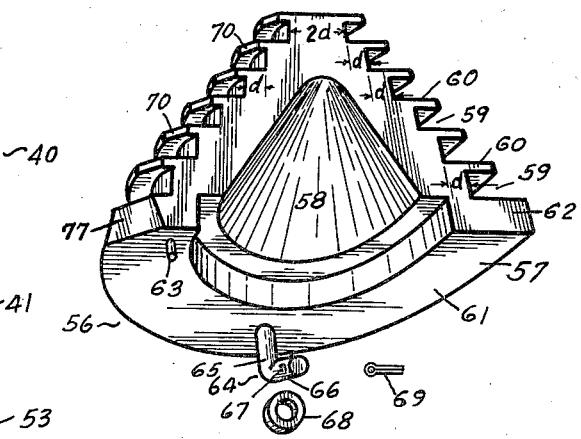
Figure 9 is a perspective view (looking from the inside of one of the twin winding forms which are elements of my novel winding head. The roller and cotter pin carried by each form are shown as dissociated therefrom for greater clearness.
Figure 7:
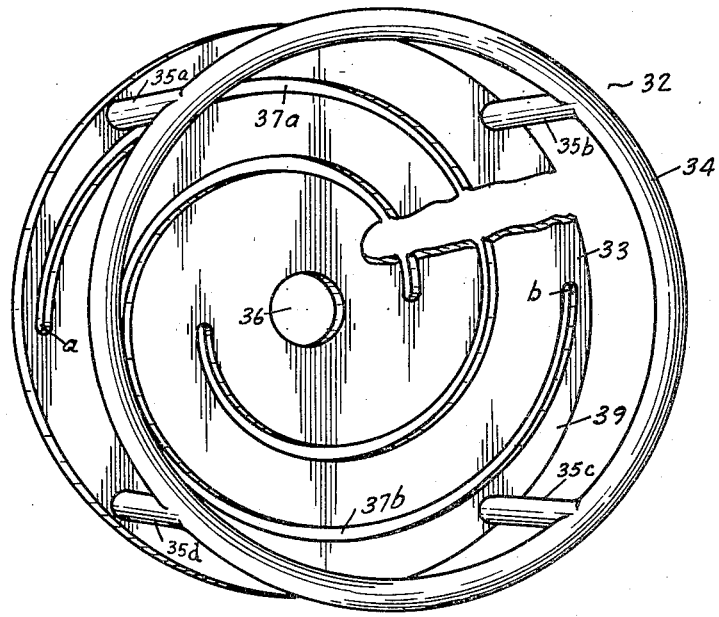
Figure 7 is a perspective of the base plate which constitutes one of the elements of my novel winding head. A portion of the plate has been broken away for the purpose of more clearly showing its structure.

The positioning plate 40 consists of a body member 41 having the substantially triangular apertures 42 formed therein and the tubular lug 43 extending rearwardly therefrom. The positioning plate 40 has formed therein the two sets of peg receiving holes 44 arranged in parallel rows 45 and columns 46. Each of said rows 45 has a number associated therewith which designates the distance D between the faces 62 of the winding forms 56 when these forms are in the position shown in Figures 1 to 5. Extending inwardly from the upper and lower faces 47 and 48 respectively of the positioning plate 40 are the lever receiving apertures 49. When my novel winding head is in the assembled position shown in Figures 1 to 6 inclusive the tubular lug 43 extends through the aperture 36 formed in the body member 33 of the base plate 32.

The base plate 32 consists of said body member 33 and the manipulating rim 34 which is attached to and spaced from the body member 33 by the legs 35a, 35b, 35c and 35d. In addition to the central aperture 36 the body member 33 has formed therein the spiral slots 37a and 37b. When the winding head is in the assembled position shown in Figures 1 to 6 inclusive the spiral slot 37a and the spiral slots 37b have extending therethrough the L shaped pin 64 of one of the winding forms 56.

Each of the twin winding forms 56 consists of a body member 57 hollowed on the inside as at 58 and having a series of wire receiving channels or grooves 59 formed on the outside surface thereof. The walls 60 of the grooves 59 are beveled at one of their ends 70 and 77. The bevel 77 permits the operator to readily see the calibrating numbers associated with the positioning apertures 44 and the bevels 70 permit the wound coils to be the more readily removed from the winding forms. The surface 61 of the form 56 is machined as is also its surface 62. Extending rearwardly from the surface 61 are the positioning pin 63 and the L shaped anchoring pin 64. When the winding head is in the assembled position shown in Figures 1 to 6 inclusive the arm 66 of the anchoring pin 64 has mounted thereon the roller 68 which is held thereon by means of the cotter pin 69 which extends through the aperture 67 formed in the arm 66.

Because of the structure hereinabove described any pair of winding forms enable me to wind coils of a constant width but of varying length.

In order to adapt my device for use in winding coils for all motors having different distances between stator slots I form a series of pairs of winding forms 56 each pair of which differs from every other pair in the fact that the distance $d$ between two adjacent wire receiving slots is different. For any one pair of forms 56 the distance $d$ is equal for all of the wire receiving slots and is equal to the distance between two adjacent coil receiving spaces in the stator. Since at least one slot is left open in practically every stator the diameter of the first wire receiving slot in any form 56 is made equal to the distance between two adjacent slots for that particular stator or $2d$. Since the distance between the coil receiving slots of stators in general use are as follows: 6 mm., 7 mm., 8 mm., 9 mm., 10 mm., 11 mm., 12.5 mm. and 14 mm., I form eight pairs of winding forms wherein the distance $d$ for the first pair is 6 mm., the distance $d$ for the second pair is 7 mm., the distance $d$ for the third pair is 8 mm., the distance $d$ for the fourth pair is 9 mm., the distance $d$ for the fifth pair is 10 mm., the distance $d$ for the sixth pair is 11 mm., the distance $d$ for the seventh pair is 12.5 mm., and the distance $d$ for the eighth pair is 14 mm.

In using my device I proceed as follows:

Given a motor for the stator of which I am to wind coils I proceed as follows:

(a) First I determine the number of coils which are to be used for each pole of the stator. (Let us assume that four (4) coils per pole are desired.)

(b) Next I determine the number of open stator spaces at each pole. (If one open space is desired I will start winding my coils on e, the first of the wire receiving grooves 59. If two open spaces are desired then I will start winding my coils on $d$, the second of the grooves 59.

(c) Next I determine the distance $d$ between two adjacent stator slots in the manner well known in the art that is by placing a rule on top of the stator cores, measuring the distance between a given number of successive coil receiving spaces, and then dividing by the number of spaces to secure the average distance between any two spaces. (Let us assume that the distance is 10 mm.)

(d) Next I measure the length of the stator core. This is equal to the distance D shown in Figure 5. (Let us assume that this distance is 108 mm.)

I now pick up that pair of winding forms having the distance $d$ equal to 10 mm.

Then I so place one of said twin winding forms upon the upper part of the positioning plate 40 that its face 61 contacts the face 52, so that its anchoring pin 64 (without the roller) goes through the triangular space 42 and the spiral slot 37—$a$, and so that the positioning pin 63 is received within one of the positioning apertures 44 in the upper row designated as 108 mm. (The particular aperture 44 in the row chosen is that aperture which will cause the face 62 of the winding form 56 to assume a position substantially at right angles to the wall 54 when the arm 65 of the anchoring pin 64 contacts said wall.) I now mount the roller 68 upon the arm 66 and insert the cotter pin 69 into the aperture 67.

I now position the second of said twin winding forms upon the lower part of the positioning plate 40 in exactly the same way that I positioned the first of said winding forms. (In this case the pin 64 goes through the slot 37—$b$.)

I now place the lever 76 into the aperture 49, and hold same while I grasp the rim 34 of the base plate and turn it in the direction opposite to the arrow B. This tightens the elements. If the respective positioning pins 63 of the respective winding forms 56 have been inserted into the proper respective apertures in the respective rows designated 108 then the face 62 will be substantially at right angles to the wall 54 when the pin arm 65 contacts said wall. If either or both of the respective faces 62 do not assume this position when the pin-arm 65 contacts said wall then the form or forms 56 (as may be necessary) must be moved over and their respective positioning pins 63 inserted into another of the apertures in the row 108. My device is so constructed that no matter which pair of forms is used there will be one positioning aperture in each row which will cause the face 62 to assume a position substantially at right angles to the wall 42 when the pin arm 65 contacts said wall.

In winding the coils the operator usually sits upon the bench 73 and feeds the wire W from the spool 75 which is loosely mounted on the shaft 74 carried by the bench 73. The operator starts and stops the motor 3 by manipulating the treadle 16. He permits the motor to run until the revolution counter 7 shows that the desired number of turns have been formed on $e$, the first groove 59, for the coil C—1, he then shifts the wire to $f$, the second groove 59, and winds the necessary number of turns for the coil C—2, then he shifts the wire to $g$, the third groove 59, and winds the necessary number of turns for the coil C—3, and then shifts the wire to $h$, the fourth groove 59, and winds the coil C—4.

To remove the coils from the winding head it is only necessary to insert the lever 76 into the aperture 49, hold the lever, grasp the rim 34 of the base plate 32, and move said base plate in the direction of the arrow B. This results in the relative motion of the winding forms, the positioning plate and the base plate from their respective positions shown in Figure 4 to their respective positions shown in Figure 6. When the winding forms reach the position shown in figure 6 the coils C—1, C—2, C—3 and C—4 may be readily removed.

If the next motor for which coils are to be wound has the same distance between stator slots as that of the motor used in the previous illustration but a different core length D then it is only necessary to shift the winding forms 56 so that the positioning pin of each form is received in an aperture in that row whose number designates the length of the stator core. For instance the number 28 designates a stator core length of 28 mm. The number 44 a core length of 44 mm., etc. This is also the distance D in mm. between the faces 56 of the two winding forms when they are in the position shown in Figures 1 to 5 inclusive.

If the next motor for which coils are to be wound has a different distance $d$ between stator slots than that of the motor used in the previous illustration I remove the cotter pin 69 and the roller 68 from the pin-arm 66 and then remove the forms 56 from the winding head. In lieu of said forms 56 I substitute another pair of winding forms having a distance $d$ equal to the distance between the stator slots of the motor to be wound and proceed as before.

Where the distance $d$ equals one of the distances $d$ of one of the winding forms of my set but the length D of the stator core does not equal D represented by the designating numerals for the rows 45 of apertures 44 then I position the pin 63 in that row 45 of apertures which is closest to the length D.

Where the distance $d$ does not equal one of the distances $d$ of one of the winding forms of my set and the length D does not equal a distance represented by the designating numerals for the rows 45 of apertures 44 then I choose a pair of forms 56 the distance $d$ of each of which is closest to the distance $d$ desired and so position the pins 63 of the same in the apertures 44 that twice the distance (D+$d$) equals the internal perimeter of the smallest coil being wound. Since the coils are flexible they can readily be positioned upon the stator by proper manipulation, flexure and pressure.

To remove the winding head as a unit from the shaft 22 it is only necessary to hold the shaft 22 and turn the winding head 5 in the proper direction. This will cause the head to screw off the shaft 22.

To disassemble the winding head 5 it is only necessary to remove the winding forms from their associated elements in the manner hereinabove set forth, then to loosen the collar 71 by turning the set screw 72 in the proper direction. This permits the disengagement of the base plate 32 from the positioning plate 40.

To reassemble the winding head I place the base plate 32 upon the positioning plate so that the faces 38 and 53 contact each other and the tubular lug 43 extends through the aperture 36. I now lock the base plate 32 against lateral movement with respect to the positioning plate 40 by positioning the collar 71 upon the lug 43 and turning the set screw 72 in the proper direction.

This however does not prevent the positioning plate from rotating relatively to the base plate.

To attach the positioning plate to the shaft it is only necessary to position the unit so that the shaft 22 enters the bore 50 and to turn the positioning plate so as to cause the threaded bore 51 to threadably engage the threaded end 31 of the shaft 22.

The above disclosure is to be understood as being by the way of illustration only and not by the way of limitation since many changes may be made in the disclosure here shown without departing from the spirit of my invention which in one of its aspects consists in forming a winding head of a base member and a pair of readily detachable winding forms and in providing said members with cooperating positioning means for positioning each of said winding forms at any one of a number of possible points on said base member. In another of its aspects my invention consists in forming a winding head of a base member and two readily detachable winding forms and in providing said members with cooperating retaining means which will permit the winding forms to be moved from a winding position to a collapsed position. In another of its aspects my invention consists in forming a winding head of a base plate and a pair of winding forms which are so constructed that the winding forms may be readily removed from and attached to the base plate. In another of its aspects my invention consists in so forming my winding head that it may be readily attached to and detached from an actuating shaft. In another of its aspects my invention consists in forming a winding head of a base member and a plural number of pairs of readily detachable winding forms and in providing said members with cooperating means so that any pair of said winding forms may be readily attached to and detached from said base member and selectively positioned at any one of a number of possible points upon said base member.

Having thus described my invention what I claim as new and useful is:

1. Apparatus for winding coils of varying length consisting of the combination of a base member, a pair of winding forms detachably attached to said base member, cooperating means carried by each of said forms and said base member for positioning each of said forms at any one of a possible number of points on said base member, and a second cooperating means carried by each of said forms and said base member for permitting said forms to be moved relatively to each other within certain limits upon said member when fixed upon a given point on said base member.

2. Apparatus for winding motor coils of varying length and width consisting of the combination of a base member, a pair of winding forms for winding coils of a definite width, a second pair of forms for winding coils of a width different than that wound on the first pair of forms, and cooperating means carried by each of said forms and said base member for interchangeably connecting any two of said forms to said base member.

3. Apparatus for winding motor coils of varying length and width consisting of the combination of a base member; a plural number of pairs of winding forms, each of said forms having a series of winding grooves formed thereon and the diameter of the winding grooves of any single pair of forms being different from the diameter of the winding grooves on every other of said pairs of forms; and cooperating means carried by each of said forms and said base member for interchangeably positioning any one of said forms at any one of a possible number of points on said base member.

4. Apparatus for winding motor coils of varying length and width consisting of the combination of a base member; a plural number of pairs of winding forms, each of said forms having a series of winding grooves formed thereon and the diameter of the winding grooves of any single pair of forms being different from the diameter of the winding grooves on every other of said pairs of forms; cooperating means carried by each of said forms for interchangeably positioning any one of said forms at any one of a possible number of points on said base member; and a second cooperating means carried by each of said forms and said base member for permitting said forms to be moved relatively to each other within certain limits upon said member when fixed upon a given point on said base member.

5. Apparatus for winding motor coils of varying length and width consisting of the combination of a base frame; means for driving said shaft; a winding head threadably attached to said shaft; said winding head consisting of a base member, a plural number of pairs of winding forms, each of said forms having a series of winding grooves formed thereon and the diameter of the winding grooves of any single pair of forms being different from the diameter of the winding grooves on every other of said pairs of forms; cooperating means carried by each of said forms for interchangeably positioning any one of said forms at any one of a possible number of points on said base member; and a second cooperating means carried by each of said forms and said base member for permitting said forms to be moved relatively to each other within certain limits upon said member when fixed upon a given point on said base member.

6. Apparatus for winding motor coils of varying length and width consisting of the combination of a base frame; a revolvable member carried by said base frame, means for driving said revolvable member; a winding head consisting of a base member, a plural number of winding forms, each of said forms having a series of winding grooves formed thereon and the diameter of the winding grooves of any single pair of forms being different from the diameter of the winding grooves on every other of said pairs of forms, and cooperating means carried by each of said forms and said base member for interchangeably positioning any one of said forms at any one of a possible number of points on said base member.

7. Apparatus for winding motor coils of varying length consisting of the combination of a base frame; a revolvable member carried by said base frame; means for driving said revolvable member; and a winding head carried by said revolvable member, said winding head consisting of a base member, a pair of winding forms detachably attached to said base member, and cooperating means carried by each of said forms and said base member for positioning each of said forms at any one of a possible number of points on said base member.

8. Apparatus for winding motor coils of varying length consisting of the combination of a base frame; a shaft carried by said base frame; means for driving said shaft; and a winding head detachably carried by said shaft, said winding head consisting of a base member, a pair of winding forms detachably attached to said base member, cooperating means carried by each of said forms and said base member for positioning each of said forms at any one of a possible number of points on said base member, and a second cooperating means carried by each of said forms and said base member for permitting said forms to be moved relatively to each other within certain limits upon said member when fixed upon a given point on said base member.

9. Apparatus for winding motor coils consisting of a base plate having a non-concentric continuous groove formed therein; a positioning plate attached to said base plate and movable with respect thereto, said positioning plate having a plural number of positioning apertures formed thereon; and a winding form having two attaching pins formed thereon attached to each of said plate one of said pins being received in one of said positioning apertures formed in said positioning plate and the other of said pins being received in said non-concentric groove formed in said base plate.

10. Apparatus for winding motor coils consisting of a base plate having a pair of spiral slots formed therein; a positioning plate attached to said base plate and movable in one plane with respect thereto, said positioning plate having two spaced apart sets of positioning apertures formed therein; and a pair of winding forms each having a plural number of winding channels formed thereon and two attaching pins extending therefrom attached to said base plate and said positioning plate with one of the pins of each of said winding forms being received in one of said groups of apertures, and the other of said pins of each of said winding forms being received in one of said spiral slots.

11. As an element of a winding head, a base plate consisting of a body member having two symmetrical but oppositely extending spiral slots formed therein, each of said slots extending through more than one hundred eighty degrees; a plurality of legs attached to said body member; and a ring connecting together said legs.

12. As an element of a winding head, a positioning plate consisting of a body member having a bore formed therein centrally thereof, said bore being threaded for at least a portion of its length; a set of positioning apertures formed in each of two diagonally disposed quadrants of said plate; and a triangular opening formed in each of the remaining two diagonally disposed quadrants of said plate.

13. As an element of a winding head, a positioning plate consisting of a body member; a lug extending outwardly from the central part of the rear face of said body member, said lug having a bore formed therein which also extends through said body member and which is threaded for at least a portion of its length; a set of positioning apertures formed in each of two diagonally disposed quadrants of said plate; and a triangular opening formed in each of the remaining two diagonally disposed quadrants of said plate.

14. As an element of a winding head, a winding form comprising a unitary body member substantially a vertical half section of the frustrum of a cone in shape; a series of grooves of differing diameter formed in the curved surface of said body member with lowermost of said grooves being the greatest in diameter and each succeeding groove being smaller in diameter than the groove immediately below it; and two spaced apart attaching pins extending outwardly from the base of said body member.

15. As an element of a winding head, a base plate consisting of a body member having two symmetrical but oppositely extending spiral slots formed therein; plurality of legs extending from said body member; and a ring connecting together said legs.

16. Apparatus for winding motor coils of varying length consisting of the combination of a base frame; a shaft carried by said base frame; means for driving said shaft; and a winding head carried by said shaft, said winding head consisting of a base plate having a pair of spiral slots formed therein, a positioning plate having two spaced apart sets of positioning apertures formed therein attached to said base plate and movable in one plane with respect thereto, and a pair of winding forms each having a plural number of winding channels formed therein and two attaching pins extending therefrom attached to said base plate and said positioning plate with one of the pins of each of said winding forms being received in one of said groups of apertures, and the other of said pins of each of said winding forms being received in one of said spiral slots.

WILLIAM WEIRICH.